US012201137B2

(12) United States Patent
Mironov et al.

(10) Patent No.: US 12,201,137 B2
(45) **Date of Patent: *Jan. 21, 2025**

(54) AEROSOL-FORMING SUBSTRATE AND AEROSOL-DELIVERY SYSTEM

(71) Applicant: Philip Morris Products S.A., Neuchatel (CH)

(72) Inventors: Oleg Mironov, Neuchatel (CH); Ihar Nikolaevich Zinovik, Peseux (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,787

(22) Filed: Mar. 24, 2023

(65) Prior Publication Data

US 2023/0232888 A1 Jul. 27, 2023

Related U.S. Application Data

(63) Continuation of application No. 16/735,903, filed on Jan. 7, 2020, now Pat. No. 11,641,872, which is a (Continued)

(30) Foreign Application Priority Data

May 21, 2014 (EP) .................................... 14169193

(51) Int. Cl.
*A24B 15/12* (2006.01)
*A24B 15/16* (2020.01)

(Continued)

(52) U.S. Cl.
CPC .............. *A24B 15/12* (2013.01); *A24B 15/16* (2013.01); *A24D 1/20* (2020.01); *A24F 40/465* (2020.01);

(Continued)

(58) Field of Classification Search
None
See application file for complete search history.

(56) References Cited

U.S. PATENT DOCUMENTS 4,256,945 A 3/1981 Carter
5,269,327 A 12/1993 Counts (Continued)

FOREIGN PATENT DOCUMENTS

EP 2 444 112 4/2012
WO WO 95/27411 10/1995

OTHER PUBLICATIONS

PCT Search Report and Written Opinion for PCT/EP2015/061218 dated Sep. 8, 2015 (9 pages).

(Continued)

*Primary Examiner* — Phu H Nguyen
(74) *Attorney, Agent, or Firm* — Oblon, McClelland, Maier & Neustadt, L.L.P.

(57) ABSTRACT

An aerosol-forming substrate is provided for use with an inductive heating device, including: a solid material to release volatile compounds to form an aerosol upon heating of the substrate, a first susceptor material to heat the substrate and having a first Curie-temperature and being arranged in thermal proximity of the solid material, and a second susceptor material having a second Curie-temperature and being arranged in thermal proximity of the solid material, the first Curie-temperature being lower than the second Curie-temperature, and the second Curie-temperature defining a maximum heating temperature of the first and second materials, the first and second materials being arranged in heaped formation at different locations within the substrate, one of the first and second susceptor materials being arranged in a central region of the substrate and the (Continued)

respective other one of the first and second susceptor materials is arranged in peripheral regions of the substrate.

20 Claims, 2 Drawing Sheets

Related U.S. Application Data continuation of application No. 14/899,742, filed on Dec. 18, 2015, now abandoned, which is a continuation of application No. PCT/EP2015/061218, filed on May 21, 2015.

(51) Int. Cl.

| | |
|---|---|
| ***A24D 1/20*** | (2020.01) |
| ***A24F 40/20*** | (2020.01) |
| ***A24F 40/465*** | (2020.01) |
| ***H05B 6/10*** | (2006.01) |

(52) U.S. Cl.
CPC .............. *H05B 6/105* (2013.01); *A24F 40/20* (2020.01); *H05B 2206/023* (2013.01)

(56) References Cited

U.S. PATENT DOCUMENTS

| | | | |
|---|---|---|---|
| 5,613,505 | A | 3/1997 | Campbell |
| 5,911,898 | A | 6/1999 | Jacobs |
| 6,681,998 | B2 | 1/2004 | Sharpe |
| 2002/0113066 | A1 | 8/2002 | Stark |
| 2008/0006796 | A1 | 1/2008 | Khatua |
| 2011/0290269 | A1 | 12/2011 | Shimizu |
| 2013/0042865 | A1 | 2/2013 | Monsees |

OTHER PUBLICATIONS

PCT Search Report and Written Opinion for PCT/EP2015/061219 dated Sep. 8, 2015 (11 pages).
PCT Search Report and Written Opinion for PCT/EP2015/061217 dated Sep. 10, 2015 (9 pages).

AEROSOL-FORMING SUBSTRATE AND AEROSOL-DELIVERY SYSTEM

CROSS-REFERENCE TO RELATED APPLICATIONS

This application is a continuation of and claims benefit under 35 U.S.C. § 120 to U.S. application Ser. No. 16/735,903, filed Jan. 7, 2020, which is a continuation of and claims benefit under 35 U.S.C. § 120 to U.S. application Ser. No. 14/899,742, filed Dec. 18, 2017, which is a U.S. National Stage application of PCT/EP2015/061218, filed May 21, 2015, which was published in English on Nov. 26, 2015 as WO 2015/177264, and claims the benefit of priority under 35 U.S.C. § 119 from European Application No. 14169193.1, filed May 21, 2014, the entire contents of each of which are incorporated herein by reference.

BACKGROUND

The present invention relates to an aerosol-forming substrate for use in combination with an inductive heating device. The invention also relates to an aerosol-delivery system.

From the prior art aerosol-delivery systems are known, which comprise an aerosol-forming substrate and an inductive heating device. The inductive heating device comprises an induction source which produces an alternating electromagnetic field which induces a heat generating eddy current in a susceptor material. The susceptor material is in thermal proximity of the aerosol-forming substrate. The heated susceptor material in turn heats the aerosol-forming substrate which comprises a material which is capable of releasing volatile compounds that can form an aerosol. A number of embodiments for aerosol-forming substrates have been described in the art which are provided with diverse configurations for the susceptor material in order to ascertain an adequate heating of the aerosol-forming substrate. Thus, an operating temperature of the aerosol-forming substrate is strived for at which the release of volatile compounds that can form an aerosol is satisfactory.

BRIEF SUMMARY

However, it would be desirable to provide an aerosol-forming substrate which allows an even better and more efficient production of aerosol upon heating.

According to one aspect of the invention an aerosol-forming substrate for use in combination with an inductive heating device is provided. The aerosol-forming substrate comprises a solid material capable of releasing volatile compounds that can form an aerosol upon heating of the aerosol-forming substrate, and at least a first susceptor material for heating of the aerosol-forming substrate. The first susceptor material has a first Curie-temperature and is arranged in thermal proximity of the solid material. The aerosol-forming substrate comprises at least a second susceptor material having a second Curie-temperature which is arranged in thermal proximity of the solid material. The first and second susceptor materials have specific absorption rate (SAR) outputs which are distinct from each other. Alternatively or in addition thereto the first Curie-temperature of the first susceptor material is lower than the second Curie-temperature of the second susceptor material, and the second Curie-temperature of the second susceptor material defines a maximum heating temperature of the first and second susceptor materials.

By having at least first and second susceptor materials with first and second Curie-temperatures distinct from one another, the prerequisite for a more efficient and controlled heating of the aerosol-forming substrate and thus of a more efficient production of an aerosol is provided. The first and second susceptor materials may have different specific absorption rate (SAR) outputs. The SAR output here is defined as Joule-output per kg susceptor material per cycle, at a given frequency and at a defined strength of an electromagnetic induction field. Due to the distinct SAR outputs, the first and second susceptor materials have different efficiencies with regard to their heat losses. Alternatively, or in addition to this specific property of the susceptor materials the first and second susceptor materials, each having its specific first or second Curie-temperature, may be activated separately. This may be achieved, e.g., with different frequencies of an alternating induction current and/or with different frequencies of an magnetic field causing the induction heating of the first and second susceptor materials. This allows for a more efficient distribution of the first and second susceptor materials within the aerosol-forming substrate, in order to achieve a customized depletion thereof. Thus, if, e.g., it is desired to have an increased heat deposition into peripheral regions of the aerosol-forming substrate, the second susceptor materials having the higher second Curie-temperature, may be arranged preferably in the peripheral regions of the aerosol-forming substrate, while the first susceptor material may be arranged preferentially in a central region thereof. It is to be noted that if is deemed appropriate, the arrangement of the first and second susceptor materials of the aerosol-forming substrate can also be inverted, thus, the first susceptor material being arranged in the peripheral regions while the second susceptor material may e.g. be arranged in a central portion of the aerosol-forming substrate. The aerosol-forming substrate in accordance with the invention allows for a customized composition thereof in accordance with specific requirements. An overheating of the aerosol-forming substrate may be prevented by selecting the second susceptor material, which has the higher second Curie-temperature such, that it defines a maximum heating temperature of the first and second susceptor materials. When the second susceptor material has reached its second Curie-temperature, its magnetic properties change from a ferromagnetic phase to a paramagnetic phase. As a consequence hysteresis losses of the second susceptor material disappear. During the inductive heating of the aerosol-forming substrate this phase-change may be detected on-line and the heating process stopped automatically. Thus, an overheating of the aerosol-forming substrate may be avoided. After the inductive heating has been stopped the second susceptor material cools down until it reaches a temperature lower than its second Curie-temperature, at which it regains its ferromagnetic properties again and its hysteresis losses reappear. This phase-change may be detected on-line and the inductive heating activated again. Thus, the inductive heating of the aerosol-forming substrate corresponds to a repeated activation and deactivation of the inductive heating device. The first susceptor material is of no further concern for this overheating prevention, because its first Curie-temperature is already lower than the second Curie-temperature of the second susceptor material.

The aerosol-forming substrate is preferably a solid material capable of releasing volatile compounds that can form an aerosol. The term solid as used herein encompasses solid materials, semi-solid materials, and even liquid components, which may be provided on a carrier material. The volatile compounds are released by heating the aerosol-forming substrate. The aerosol-forming substrate may comprise nicotine. The nicotine containing aerosol-forming substrate may be a nicotine salt matrix. The aerosol-forming substrate may comprise plant-based material. The aerosol-forming substrate may comprise tobacco, and preferably the tobacco containing material contains volatile tobacco flavour compounds, which are released from the aerosol-forming substrate upon heating. The aerosol-forming substrate may comprise homogenised tobacco material. Homogenised tobacco material may be formed by agglomerating particulate tobacco. The aerosol-forming substrate may alternatively comprise a non-tobacco-containing material. The aerosol-forming substrate may comprise homogenised plant-based material.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the inductive heating device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine.

The aerosol-forming substrate may comprise other additives and ingredients, such as flavourants. The aerosol-forming substrate preferably comprises nicotine and at least one aerosol-former. In a particularly preferred embodiment, the aerosol-former is glycerine. The susceptor materials being in thermal proximity of the aerosol-forming substrate allow for a more efficient heating and thus, higher operating temperatures may be reached. The higher operating temperature enables glycerine to be used as an aerosol-former which provides an improved aerosol as compared to the aerosol-formers used in the known systems.

In an embodiment of the aerosol-forming substrate according to the invention the second Curie-temperature of the second susceptor material may be selected such that upon being inductively heated an overall average temperature of the aerosol-forming substrate does not exceed 240° C. The overall average temperature of the aerosol-forming substrate here is defined as the arithmetic mean of a number of temperature measurements in central regions and in peripheral regions of the aerosol-forming substrate. By pre-defining a maximum for the overall average temperature the aerosol-forming substrate may be tailored to an optimum production of aerosol.

In another embodiment of the aerosol-forming substrate the second Curie-temperature of the second susceptor material is selected such that is does not exceed 370° C., in order to avoid a local overheating of the aerosol-forming substrate comprising the solid material which is capable of releasing volatile compounds that can form an aerosol.

In accordance with another aspect of the invention the first and second susceptor materials comprised in the aerosol-forming substrate may be of different geometrical configurations. Thus, at least one of the first and second susceptor materials, respectively, may be of one of a particulate, or a filament, or a mesh-like configuration. By having different geometrical configurations, the first and second susceptor materials may be tailored to their specific tasks and may be arranged within the aerosol-forming substrate in a specific manner for an optimisation of the aerosol production.

Thus, in an embodiment of the aerosol-forming substrate according to the invention at least one of the first and second susceptor materials may be of particulate configuration. The particles preferably have an equivalent diameter of 10 μm-100 μm and are distributed within the aerosol-forming substrate. The equivalent spherical diameter is used in combination with particles of irregular shape and is defined as the diameter of a sphere of equivalent volume.

At the selected sizes the particulate first and/or second susceptor material(s) may be distributed within the aerosol-forming substrate as required and they may be securely retained within aerosol-forming substrate. The particulate first and/or second susceptor material(s) may be distributed about homogeneously, or they may be distributed throughout the aerosol-forming substrate in heaped formation with local concentration peaks. Thus, in an embodiment of the aerosol-forming substrate according to the invention the first susceptor material may be arranged in a central region of the aerosol-forming substrate, preferably along an axial extension thereof, and the second susceptor material may be arranged in peripheral regions of the aerosol-forming substrate. With this embodiment of the aerosol-formation substrate heating is not only concentrated in a central region thereof along its axial extension, but it may also be accomplished in the peripheral regions. The degree of heat deposition into the solid material capable of releasing volatile compounds that can form an aerosol upon heating of the aerosol-forming substrate will also depend on the concentration of first and second susceptor materials at the respective locations.

In another embodiment of the aerosol-forming substrate at least one of the first and second susceptor materials may be of a filament configuration being arranged within the aerosol-forming substrate. The first or second susceptor material, respectively, of filament configuration may e.g. be combined with a second or first susceptor material, respectively, of particulate configuration. In another embodiment of the invention the first and second susceptor materials, both, may be of a filament configuration. In yet another embodiment of the aerosol-forming substrate according to the invention the first or second susceptor material, respectively, of filament configuration may be arranged such that it extends about axially throughout the aerosol-forming substrate. First and/or second susceptor materials, respectively, of filament configuration may have advantages with regard to their manufacture, and their geometrical regularity and reproducibility. The geometrical regularity and reproducibility also may prove advantageous in a controlled local heating of the solid material at the respective locations.

In yet another embodiment of the aerosol-forming substrate according to the invention at least one of the first and second susceptor materials may be of a mesh-like configuration. The first or second susceptor material, respectively, of mesh-like configuration may be arranged inside of the aerosol-forming substrate or it may at least partly form an encasement for the solid material. The first or second susceptor materials, respectively, of mesh-like configuration may be combined with second or first susceptor materials, respectively, having a particulate configuration, or they may be combined with second or first susceptor materials, respectively, of filament configuration. The term "mesh-like configuration" includes layers having discontinuities therethrough. For example the layer may be a screen, a mesh, a grating or a perforated foil.

In a still further embodiment of the aerosol-forming substrate the first and second susceptor materials may be assembled to form a mesh-like structural entity. The mesh-like structural entity may e.g. extend axially throughout the aerosol-forming substrate. In another embodiment of the aerosol-forming substrate the mesh-like structural entity of the first and second susceptor materials may at least partly form an encasement for the solid material. The term "mesh-like structural entity" designates all structures which may be assembled from the first and second susceptor materials and have discontinuities therethrough, including screens, gratings and meshes.

It should be noted that in some of the embodiments of the aerosol-forming substrate it may be desirable that the first and second susceptor materials be of a geometrical configuration distinct from each other. In other embodiments of the aerosol-forming substrate it may be desirable, e.g. for manufacturing purposes of the aerosol-forming substrate, that the first and second susceptor materials be of similar geometrical configuration.

The aerosol-forming substrate may be of a generally cylindrical shape and may be enclosed by a tubular casing, such as, e.g., an overwrap. The tubular casing, such as, e.g. the overwrap, may help to stabilize the shape of the aerosol-forming substrate and to prevent an accidental disassociation of the solid material which is capable of releasing volatile compounds that can form an aerosol, and the first and second susceptor materials.

In another embodiment the aerosol-forming substrate may be attached to a mouthpiece, which optionally may comprise a filter plug. The aerosol-forming substrate comprising the solid material which is capable of releasing volatile compounds that can form an aerosol upon heating of the aerosol-forming substrate and the first and second susceptor materials, and the mouthpiece are assembled to form a structural entity. Every time a new aerosol-forming substrate is to be used in combination with an inductive heating device, the user is automatically provided with a new mouthpiece, which might be desirable from a hygienic point of view. Optionally the mouthpiece may be provided with a filter plug, which may be selected in accordance with the composition of the aerosol-forming substrate.

An aerosol-delivery system according to the invention comprises an inductive heating device and an aerosol-forming substrate according to any one of the afore-described embodiments. With such an aerosol-delivery system an improved generation of aerosol may be achieved. By a controlled arrangement of the first and second susceptor materials an optimised heating of the aerosol-forming substrate and thus an improved generation of aerosol may be achieved.

In an embodiment of the aerosol-delivery system the inductive heating device is provided with an electronic control circuitry, which is adapted for a successive or alternating heating of the first and second susceptor materials of the aerosol-forming substrate. Thus, also depending on the distribution of the first and second susceptor materials throughout the aerosol-forming substrate, a customized control of the induction heating of the aerosol-forming substrate may be reached and, in consequence, a customized depletion of the solid material comprised in the aerosol-forming substrate of volatile compounds that can form an aerosol of may be achieved.

The afore-described embodiments of the aerosol-forming substrate and of the aerosol-delivery system will become more apparent from the following detailed description, reference being made to the accompanying schematic drawings which are not to scale, in which:

DETAILED DESCRIPTION

Inductive heating is a known phenomenon described by Faraday's law of induction and Ohm's law. More specifically, Faraday's law of induction states that if the magnetic induction in a conductor is changing, a changing electric field is produced in the conductor. Since this electric field is produced in a conductor, a current, known as an eddy current, will flow in the conductor according to Ohm's law. The eddy current will generate heat proportional to the current density and the conductor resistivity. A conductor which is capable of being inductively heated is known as a susceptor material. The present invention employs an inductive heating device equipped with an inductive heating source, such as, e.g., an induction coil, which is capable of generating an alternating electromagnetic field from an AC source such as an LC circuit. Heat generating eddy currents are produced in the susceptor material which is in thermal proximity to a solid material which is capable of releasing volatile compounds that can form an aerosol upon heating of the aerosol-forming substrate and which is comprised in an aerosol-forming substrate. The term solid as used herein encompasses solid materials, semi-solid materials, and even liquid components, which may be provided on a carrier material. The primary heat transfer mechanisms from the susceptor material to the solid material are conduction, radiation and possibly convection.

Figure 1:
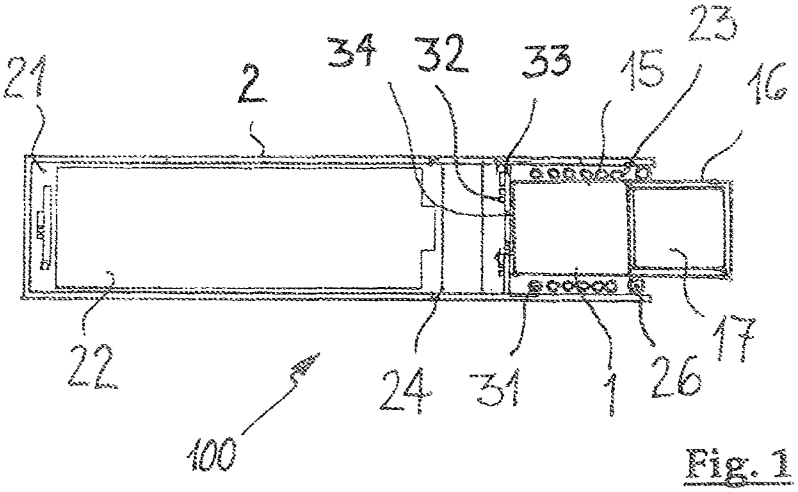
FIG. 1 is a schematic drawing of an aerosol-delivery system comprising an inductive heating device and an aerosol-forming substrate inserted into the device.

In schematic FIG. 1 an exemplary embodiment of an aerosol-delivery system according to the invention is generally designated with reference numeral 100. The aerosol-delivery system 100 comprises an inductive heating device 2 and an aerosol-forming substrate 1 associated therewith. The inductive heating device 2 may comprise an elongated tubular housing 20 having an accumulator chamber 21 for accommodating an accumulator 22 or a battery, and a heating chamber 23. The heating chamber 23 may be provided with an inductive heating source, which, as shown in the depicted exemplary embodiment, may be constituted by an induction coil 31 which is electrically connected with an electronic circuitry 32. The electronic circuitry 32 may e.g. be provided on a printed circuit board 33 which delimits an axial extension of the heating chamber 23. The electric power required for the inductive heating is provided by the accumulator 22 or the battery which is accommodated in the accumulator chamber 21 and which is electrically connected with the electronic circuitry 32. The heating chamber 23 has an internal cross-section such that the aerosol-forming substrate 1 may be releasably held therein and may easily be removed and replaced with another aerosol-forming substrate 1 when desired.

The aerosol-forming substrate 1 may be of a generally cylindrical shape and may be enclosed by a tubular casing 15, such as, e.g., an overwrap. The tubular casing 15, such as, e.g. the overwrap, may help to stabilize the shape of the aerosol-forming substrate 1 and to prevent an accidental loss of the contents of the aerosol-forming substrate 1. As shown in the exemplary embodiment of the aerosol-delivery system 100 according to the invention, the aerosol-forming substrate 1 may be connected to a mouthpiece 16, which with the aerosol-forming substrate 1 inserted into the heating chamber 23 at least partly protrudes from the heating chamber 23. The mouthpiece 16 may comprise a filter plug 17 filter plug, which may be selected in accordance with the composition of the aerosol-forming substrate 1. The aerosol-forming substrate 1 and the mouthpiece 16 may be assembled to form a structural entity. Every time a new aerosol-forming substrate 1 is to be used in combination with the inductive heating device 2, the user is automatically provided with a new mouthpiece 16, which might be appreciated from a hygienic point of view.

As shown in FIG. 1 the induction coil 31 may be arranged in a peripheral region of the heating chamber 23, in vicinity of the housing 20 of the inductive heating device 2. The windings of the induction coil 31 enclose a free space of the heating chamber 23 which is capable to accommodate the aerosol-forming substrate 1. The aerosol-forming substrate 1 may be inserted into this free space of the heating chamber 23 from an open end of the tubular housing 20 of the inductive heating device 2 until it reaches a stop, which may be provided inside the heating chamber 23. The stop may be constituted by at least one lug protruding from an inside wall of the tubular housing 20, or it may be constituted by the printed circuit board 33, which delimits the heating chamber 23 axially, as it is shown in the exemplary embodiment depicted in FIG. 1. The inserted aerosol-forming substrate 1 may be releasably held within the heating chamber 23 e.g. by an annular sealing gasket 26, which may be provided in vicinity of the open end of the tubular housing 20.

The aerosol-forming substrate 1 and the optional mouthpiece 16 with the optional filter plug 17 are pervious to air. The inductive heating device 2 may comprise a number of vents 24, which may be distributed along the tubular housing 20. Air passages 34 which may be provided in the printed circuit board 33 enable airflow from the vents 24 to the aerosol-forming substrate 1. It should be noted, that in alternative embodiments of the inductive heating device 2 the printed circuit board 33 may be omitted such that air from the vents 24 in the tubular housing 20 may reach the aerosol-forming substrate 1 practically unimpeded. The inductive heating device 2 may be equipped with an air flow sensor (not shown in FIG. 1) for activation of the electronic circuitry 32 and the induction coil 31 when incoming air is detected. The air flow sensor may e.g. be provided in vicinity of one of the vents 24 or of one of the air passages 34 of the printed circuit board 33. Thus, a user may suck at the mouthpiece 16, in order to initiate the inductive heating of the aerosol-forming substrate 1 Upon heating an aerosol, which is released by the solid material comprised in the aerosol-forming substrate 1, may be inhaled together with air which is sucked through the aerosol-forming substrate 1.

Figure 2:
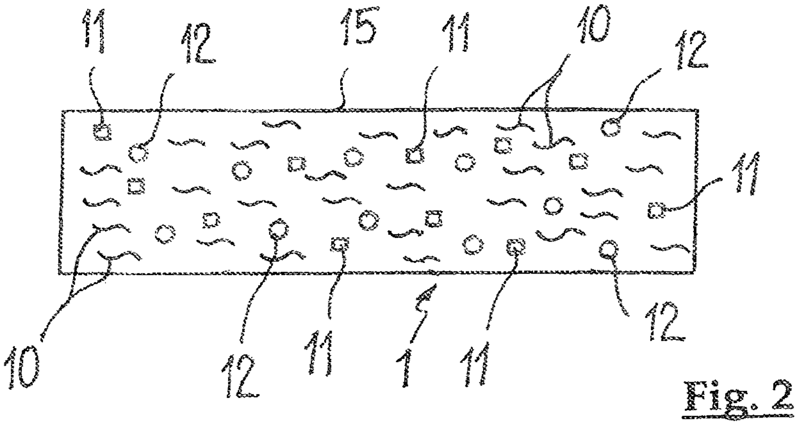
FIG. 2 shows a first embodiment of an aerosol-forming substrate comprising first and second susceptor materials of particulate configuration which are about homogenously distributed within the aerosol-forming substrate.

FIG. 2 schematically shows a first embodiment of an aerosol-forming substrate which is generally designated with reference numeral 1. The aerosol-forming substrate 1 may comprise a generally tubular casing 15, such as, e.g., an overwrap. The tubular casing 15 may be made of a material which does not noticeably impede an electromagnetic field reaching the contents of the aerosol-forming substrate 1. E.g. the tubular casing 15 may be a paper overwrap. Paper has a high magnetic permeability and in an alternating electromagnetic field is not heated by eddy currents. The aerosol-forming substrate 1 comprises a solid material 10 which is capable of releasing volatile compounds that can form an aerosol upon heating of the aerosol-forming substrate 1 and at least a first susceptor material 11 for heating the aerosol-forming substrate 1. The first susceptor material 11 has a first Curie-temperature and is arranged in thermal proximity of the solid material 10. The term solid as used herein encompasses solid materials, semi-solid materials, and even liquid components, which may be provided on a carrier material. The aerosol-forming substrate 1 further comprises at least a second susceptor material 12 having a second Curie-temperature which too is arranged in thermal proximity of the solid material. The first Curie-temperature of the first susceptor material 11 is lower than the second Curie-temperature of the second susceptor material 12. The second Curie-temperature of the second susceptor material 12 defines a maximum heating temperature of the first and second susceptor materials 11, 12.

By having at least first and second susceptor materials 11, 12 with specific first and second Curie-temperatures distinct from one another, the prerequisite for a more efficient and controlled inductive heating of the aerosol-forming substrate 1 and thus of a more efficient production of an aerosol is provided. The first and second susceptor materials 11, 12, each having its specific first or second Curie-temperature, may be activated separately. This may be achieved, e.g., with different frequencies of an alternating induction current and/or with different frequencies of an magnetic field causing the inductive heating of the first and second susceptor materials 11, 12. This allows for a more efficient distribution of the first and second susceptor materials 11, 12 within the aerosol-forming substrate 1, in order to achieve a customized depletion thereof. Thus, if, e.g., it is desired to have an increased heat deposition into peripheral regions of the aerosol-forming substrate 1, the second susceptor material 12 having the higher second Curie-temperature, may be arranged preferably in the peripheral regions of the aerosol-forming substrate 1, while the first susceptor material 11 may be arranged preferentially in a central region of the aerosol-forming substrate 1. It is to be noted that if is deemed appropriate, the arrangement of the first and second susceptor materials 11, 12 of the aerosol-forming substrate 1 can also be inverted; thus, the first susceptor material 11 being arranged in the peripheral regions while the second susceptor material 12 may e.g. be arranged in a central portion of the aerosol-forming substrate 1. The aerosol-forming substrate 1 in accordance with the invention allows for a customized composition thereof in accordance with specific requirements. An overheating of the aerosol-forming substrate 1 may be prevented by selecting the second susceptor material 12, which has the higher second Curie-temperature such, that it defines a maximum heating temperature of the first and second susceptor materials 11, 12. When the second susceptor material 12 has reached its second Curie-temperature, its magnetic properties change from a ferromagnetic phase to a paramagnetic phase. As a consequence hysteresis losses of the second susceptor material 12 disappear. During the inductive heating of the aerosol-forming substrate 1 this phase-change may be detected on-line and the heating process may be stopped automatically. Thus, an overheating of the aerosol-forming substrate 1 may be avoided. After the inductive heating has been stopped the second susceptor material 12 cools down until it reaches a temperature which is lower than its second Curie-temperature, at which it regains its ferromagnetic properties again and its hysteresis losses reappear. This phase-change may be detected on-line and the inductive heating may be activated again. Thus, the inductive heating of the aerosol-forming substrate 1 corresponds to a repeated activation and deactivation of the inductive heating device. The first susceptor material 11 is of no further concern for this overheating prevention, because its first Curie-temperature is already lower than the second Curie-temperature of the second susceptor material 12.

The first and second susceptor materials 11, 12, both, may be optimized with regard to heat loss and thus heating efficiency. Thus, the first and second susceptor materials 11, 12 should have a low magnetic reluctance and a correspondingly high relative permeability to optimize surface eddy currents generated by an alternating electromagnetic field of a given strength. The first and second susceptor materials 11, 12 should also have relatively low electrical resistivities in order to increase Joule heat dissipation and thus heat loss.

The second Curie-temperature of the second susceptor material 12 may be selected such that upon being inductively heated an overall average temperature of the aerosol-forming substrate 1 does not exceed 240° C. The overall average temperature of the aerosol-forming substrate 1 here is defined as the arithmetic mean of a number of temperature measurements in central regions and in peripheral regions of the aerosol-forming substrate. In another embodiment of the aerosol-forming substrate 1 the second Curie-temperature of the second susceptor material 12 may be selected such that is does not exceed 370° C., in order to avoid a local overheating of the aerosol-forming substrate 1 comprising the solid material 10 which is capable of releasing volatile compounds that can form an aerosol.

The afore-described basic composition of the aerosol-forming substrate 1 of the exemplary embodiment of FIG. 2 is common to all further embodiments of the aerosol-forming substrate 1 which will be described hereinafter.

As shown in FIG. 2 the aerosol-forming substrate 1 comprises first and second susceptor materials 11, 12, which, both, may be of particulate configuration. The first and second susceptor materials 11, 12 preferably have an equivalent spherical diameter of 10 μm-100 μm and are distributed throughout the aerosol-forming substrate. The equivalent spherical diameter is used in combination with particles of irregular shape and is defined as the diameter of a sphere of equivalent volume. At the selected sizes the particulate first and second susceptor materials 11, 12 may be distributed throughout the aerosol-forming substrate 1 as required and they may be securely retained within aerosol-forming substrate 1. The particulate susceptor materials 11, 12 may be distributed throughout the solid material 10 about homogeneously, as shown in the exemplary embodiment of the aerosol-forming substrate 1 according to FIG. 2.

Figure 3:
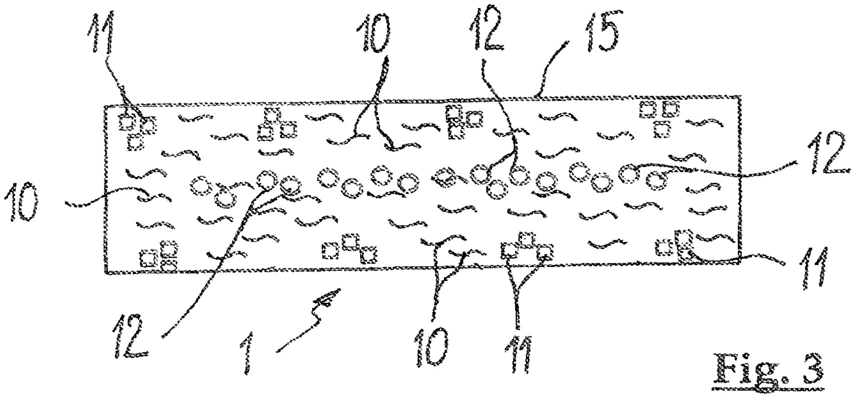
FIG. 3 shows a second embodiment of an aerosol-forming substrate comprising first and second susceptor materials of particulate configuration which are distributed in heaps in central and peripheral regions of the aerosol-forming substrate.

FIG. 3 shows another embodiment of an aerosol-forming substrate 1 which again is generally designated with reference numeral 1. The aerosol-forming substrate 1 may be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first and second susceptor materials 11, 12, both, may be of particulate configuration again, preferably having an equivalent spherical diameter of 10 μm-100 μm. The particulate first and second susceptor materials 11, 12 may have a distribution gradient e.g. from a central axis of the aerosol-forming substrate 1 to the periphery thereof, or, as shown in FIG. 3, the particulate first susceptor material 11 may be concentrated along a central of the aerosol-forming substrate 1, while the particulate second susceptor material 12 may be distributed in peripheral regions of the aerosol-forming substrate 1 with local concentration peaks, or vice versa.

Figure 4:
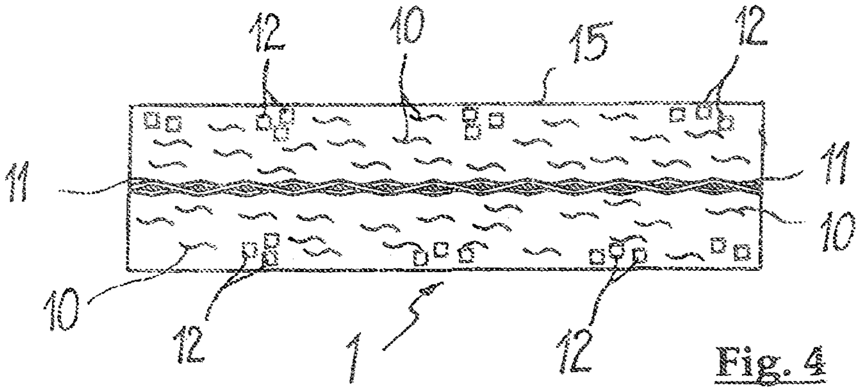
FIG. 4 shows a third embodiment of an aerosol-forming substrate comprising a second susceptor material of particulate configuration and a first susceptor of filament configuration.

In FIG. 4 a further embodiment of an aerosol-forming substrate is shown, which again bears reference numeral 1. The aerosol-forming substrate 1 may be of a generally cylindrical shape and may be enclosed by a tubular casing 15, such as, e.g., an overwrap. The aerosol-forming substrate 1 comprises a solid material 10 which is capable of releasing volatile compounds that can form an aerosol upon heating of the aerosol-forming substrate 1 and at least first and second susceptor materials 11, 12. The first susceptor material 11 may be of a filament configuration. The first susceptor material of filament configuration may have different lengths and diameters and may be distributed throughout the solid material. As exemplarily shown in FIG. 4 the first susceptor material 11 of filament configuration may be of a wire-like shape and may extend about axially through a longitudinal extension of the aerosol-forming substrate 1. The second susceptor material 12 may be of particulate configuration and may be distributed throughout the solid material 10 with local concentration peaks. Alternatively the second susceptor material may also be homogeneously distributed throughout the solid material 10. It should be noted though, that as need may be, the geometrical configuration of the first and second susceptor materials 11, 12 may be interchanged. Thus, the second susceptor material 12 may be of filament configuration and the first susceptor material 11 may be of particulate configuration.

Figure 5:
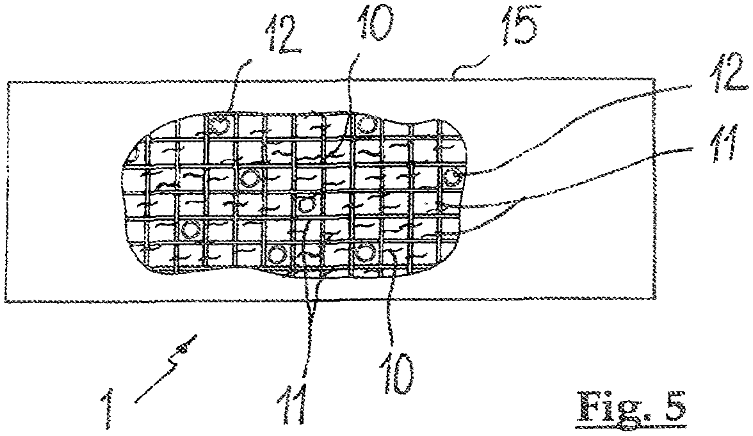
FIG. 5 shows a fourth embodiment of an aerosol-forming substrate comprising a first susceptor material of particulate configuration and a second susceptor material of mesh-kind configuration.

In FIG. 5 yet another exemplary embodiment of an aerosol-forming substrate is shown, which again is generally designated with reference numeral 1. The aerosol-forming substrate 1 may again be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first susceptor material 11 may be of a mesh-like configuration which may be arranged inside of the aerosol-forming substrate 1 or, alternatively, may at least partially form an encasement for the solid material 10. The term "mesh-like configuration" includes layers having discontinuities therethrough. For example the layer may be a screen, a mesh, a grating or a perforated foil. The second susceptor material 12 may be of particulate configuration and may be distributed throughout the solid material 10. Again it should be noted, that, as need may be, the geometrical configuration of the first and second susceptor materials 11, 12 may be interchanged. Thus, the second susceptor material 12 may be of a mesh-like configuration and the first susceptor material 11 may be of particulate configuration.

Figure 6:
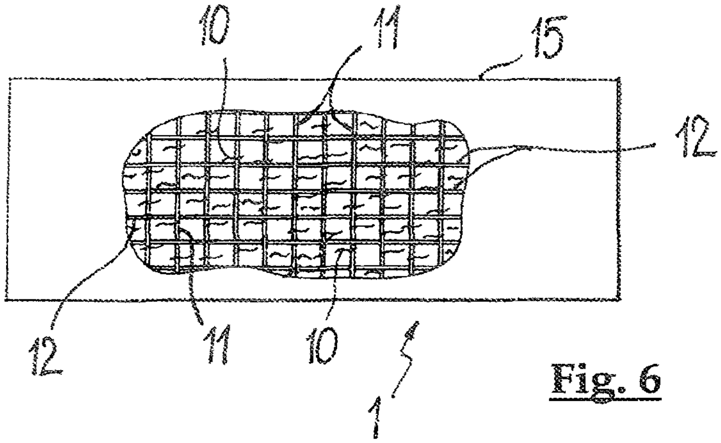
FIG. 6 shows another embodiment of an aerosol-forming substrate comprising first and second susceptor materials which have been assembled to form a mesh-like structural entity.

In FIG. 6 still another exemplary embodiment of an aerosol-forming substrate is shown, which again is generally designated with reference numeral 1. The aerosol-forming substrate 1 may again be of a generally cylindrical shape and may be enclosed by a tubular casing 15, such as, e.g., an overwrap. The aerosol-forming substrate comprises solid material 10 which is capable of releasing volatile compounds that can form an aerosol upon heating of the aerosol-forming substrate 1 and at least first and second susceptor materials 11, 12. The first and second susceptor materials 11, 12 may be assembled to form a mesh-like structural entity. The mesh-like structural entity may, e.g., extend axially within the aerosol-forming substrate 1. Alternatively the mesh-like structural entity of first and second susceptor materials 11, 12 may at least partially form an encasement for the solid material 10. The term "mesh-like structure" designates all structures which may be assembled from the first and second susceptor materials and have discontinuities therethrough, including screens, meshes, gratings or a perforated foil. The mesh-like structural entity may be composed of horizontally extending filaments of first susceptor material 11 and of vertically extending filaments of second susceptor material 12, or vice versa.

While different embodiments of the invention have been described with reference to the accompanying drawings, the invention is not limited to these embodiments. Various changes and modifications are conceivable without departing from the overall teaching of the present invention. Therefore, the scope of protection is defined by the appended claims.

The invention claimed is:

1. An aerosol-forming substrate for use in combination with an inductive heating device, the aerosol-forming substrate comprising:

a solid material configured to release volatile compounds that can form an aerosol upon heating of the aerosol-forming substrate, at least a first susceptor material configured to heat the aerosol-forming substrate, the first susceptor material having a first Curie-temperature and being arranged in thermal proximity of the solid material, and at least a second susceptor material having a second Curie-temperature and being arranged in thermal proximity of the solid material, the first Curie-temperature of the first susceptor material being lower than the second Curie-temperature of the second susceptor material, and the second Curie-temperature of the second susceptor material defining a maximum heating temperature of the first and second susceptor materials, wherein the first and second susceptor materials are arranged in heaped formation at different locations within the aerosol-forming substrate, wherein one of the first and second susceptor materials is arranged in a central region of the aerosol-forming substrate and the respective other one of the first and second susceptor materials is arranged in peripheral regions of the aerosol-forming substrate.

2. The aerosol-forming substrate according to claim 1, wherein the one of the first and second susceptor materials is arranged only in the central region of the aerosol-forming substrate and the respective other one of the first and second susceptor materials is arranged only in the peripheral regions of the aerosol-forming substrate.

3. The aerosol-forming substrate according to claim 1, wherein the one of the first and second susceptor material is arranged along an axial extension of the aerosol-forming substrate.

4. The aerosol-forming substrate according to claim 1, wherein at least one of the first and second susceptor material is one of a particulate, or filament, or mesh-like configuration.

5. The aerosol-forming substrate according to claim 1, wherein the first or second susceptor material is of a particulate configuration.

6. The aerosol-forming substrate according to claim 5, wherein at least one of the first and second susceptor materials is a ferromagnetic susceptor material.

7. The aerosol-forming substrate according to claim 1, wherein the one of the first and second susceptor materials arranged in the central region of the aerosol-forming substrate is of a filament configuration.

8. The aerosol-forming substrate according to claim 1, wherein the one of the first and second susceptor materials arranged in the central region of the aerosol-forming substrate is of a filament configuration extending along an axial extension of the aerosol-forming substrate.

9. The aerosol-forming substrate according to claim 1, wherein at least one of the first and second susceptor materials is a ferromagnetic susceptor material.

10. The aerosol-forming substrate according to claim 9, wherein the first Curie-temperature is a temperature at which the magnetic properties of the first susceptor material changes from a ferromagnetic phase to a paramagnetic phase, and wherein the second Curie-temperature is a temperature at which the magnetic properties of the second susceptor material changes from a ferromagnetic phase to a paramagnetic phase.

11. The aerosol-forming substrate according to claim 1, wherein the second Curie-temperature of the second susceptor material does not exceed 370° C.

12. The aerosol-forming substrate according to claim 1, wherein the first and second Curie-temperatures of the first and second susceptor materials are selected such that, upon being inductively heated, an overall average temperature of the aerosol-forming substrate does not exceed 240° C.

13. The aerosol-forming substrate according to claim 1, wherein the first or second susceptor material arranged in peripheral regions of the aerosol-forming substrate is of mesh-like configuration and at least partially forms an encasement for the aerosol-forming substrate.

14. The aerosol-forming substrate according to claim 1, wherein the aerosol-forming substrate comprises tobacco material.

15. The aerosol-forming substrate according to claim 1, wherein the aerosol-forming substrate comprises nicotine.

16. The aerosol-forming substrate according to claim 1, wherein the aerosol-forming substrate comprises homogenized plant-based material.

17. The aerosol-forming substrate according to claim 1, wherein the aerosol-forming substrate comprises homogenized tobacco material.

18. The aerosol-forming substrate according to claim 1, wherein the aerosol-forming substrate comprises an aerosol-former comprising glycerine.

19. The aerosol-forming substrate according to claim 1, wherein the aerosol-forming substrate has a cylindrical shape.

20. An aerosol-delivery system comprising:

an inductive heating device; and the aerosol forming substrate according to claim 1.

* * * * *